United States Patent [19]

Collett

[11] 4,150,546
[45] Apr. 24, 1979

[54] METHOD AND APPARATUS FOR LOAD FOLLOWING WITH A SINGLE-CYCLE BOILING MODERATOR-COOLANT NUCLEAR REACTOR

[75] Inventor: Wells I. Collett, Los Gatos, Calif.

[73] Assignee: General Electric Company, San Jose, Calif.

[21] Appl. No.: 747,133

[22] Filed: Dec. 3, 1976

[51] Int. Cl.$^2$ .............................................. G21D 3/08
[52] U.S. Cl. ...................................... 60/644; 60/652; 60/678; 60/680
[58] Field of Search ................. 60/644, 652, 653, 662, 60/663, 677–680, 648, 660, 664, 665, 667; 290/40 R, 4 R; 176/19 R, 38

[56] References Cited

U.S. PATENT DOCUMENTS

| | | | |
|---|---|---|---|
| 1,499,697 | 7/1924 | Ruths | 60/652 X |
| 1,728,375 | 9/1929 | Stender | 60/652 X |
| 3,271,953 | 9/1966 | Carson | 60/644 X |
| 3,630,839 | 12/1971 | Podolsky | 60/652 X |

*Primary Examiner*—Allen M. Ostrager
*Assistant Examiner*—Stephen F. Husar
*Attorney, Agent, or Firm*—Ivor J. James, Jr.; Samuel E. Turner; Sam E. Laub

[57] ABSTRACT

The invention is directed to a method and apparatus for providing a single-cycle boiling moderator-coolant nuclear reactor which accommodates changes in demand with a turbine generator on direct governor control. Current single-cycle boiling moderator-coolant nuclear reactors employ turbine generators that are slaved to the reactor. This arrangement is dictated because of inherent response limitations of the single-cycle boiling moderator-coolant nuclear reactor. The system of the present invention diverts steam from steam consuming normal auxiliary plant equipment to maintain reactor pressure when a rapid increase in turbine power demand is made such as during a daily load following or a frequency regulation change in demand. This allows the turbine generator to be placed on direct governor control. Rapid positive or negative demands accepted by the turbine cause a decrease or an increase in the pressure of the reactor. Reactor pressure is monitored by a pressure regulator which in the case of a rapid increase in demand throttles steam normally directed to feedwater heaters or steam reheaters and redirects the steam to the turbine. In the case of a rapid decrease in demand the pressure regulator by-passes a portion of the primary flow of steam to a condenser. Steam is redirected or by-passed until the reactor has time to respond to the change in demand.

22 Claims, 6 Drawing Figures

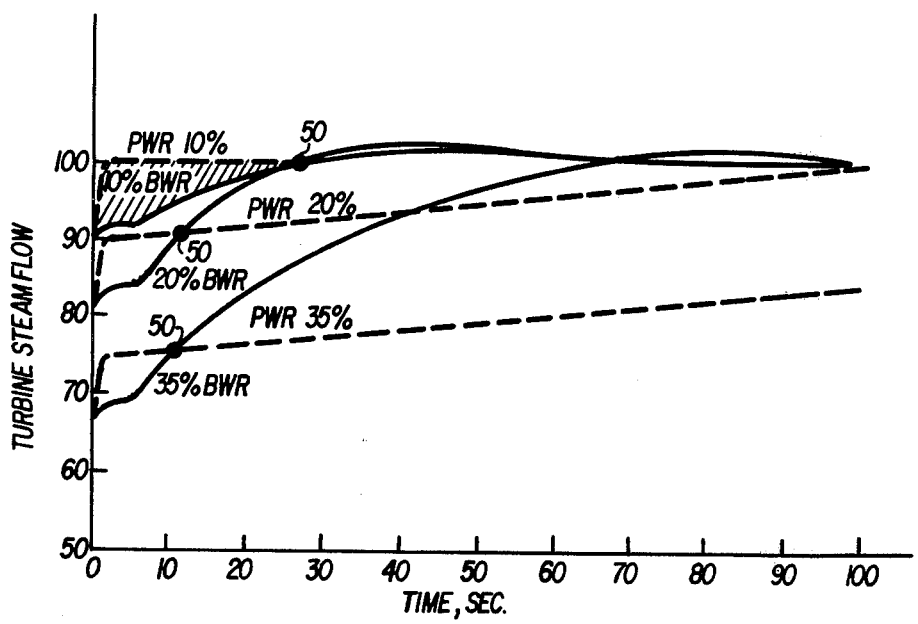
FIG. 2 RESPONSE TO POSITIVE DEMAND STEPS
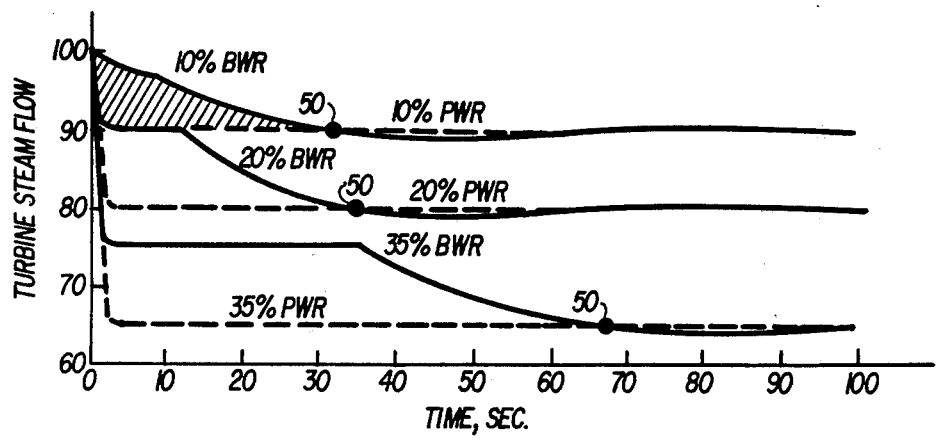
FIG. 3 RESPONSE TO NEGATIVE DEMAND STEPS

METHOD AND APPARATUS FOR LOAD FOLLOWING WITH A SINGLE-CYCLE BOILING MODERATOR-COOLANT NUCLEAR REACTOR

BACKGROUND OF THE INVENTION

1. Field of the Invention

The invention is directed to a method and apparatus for load following with a single-cycle boiling moderator-coolant nuclear reactor.

2. Description of the Prior Art

Several different types of nuclear power reactors, using the heat energy produced by nuclear fission reactions to perform useful work, have been developed. Reactors of the single-cycle boiling moderator-coolant type, such as boiling water reactors, hereinafter referred to as BWR's have been found to be highly desirable for many applications. A typical reactor of this type includes a chain reacting assembly or core made up of nuclear fuel material contained in fuel elements. Fuel material is encased in a corrosion-resistant heat conductive shell or cladding. The reactor core, made up of a plurality of these elements in spaced relationship, is enclosed in a pressure vessel through which the reactor moderator-coolant flows. As the coolant passes between the spaced fuel elements, it is heated and evaporated by the energy given off during the fission reactions. The resulting steam leaves the reactor, is directed to a fluid-driven power system such as a turbine generator system, is condensed and is finally recycled back to the reactor.

In such reactors, the coolant acts to remove heat from the reactor core, to slow down or moderate fast neutrons released through fission events in the fuel, to increase the probability of an occurrence of subsequent fissions and to maintain a chain fission reaction. As boiling occurs within the core, the formation of vapor bubbles in the coolant decreases the amount of liquid moderator in the reactor core, thereby decreasing reactivity. Thus, increased reactivity in the core tends to increase heat generation forming more vapor bubbles. These bubbles, in turn, tend to decrease reactivity. In this manner the reactor is self-regulating. The general reactivity level in such a reactor is set by adjusting the control rods. For example, if the control rods are partially withdrawn, neutron flux level and, therefore, reactivity increases. The increased reactivity increases heat generation which causes formation of additional vapor bubbles. As the vapor bubbles form, the moderation effect of the coolant decreases, compensating partially for the increased reactivity. Boiling will continue at this level so long as reactor pressure remains constant. However, if pressure is changed substantially during operation without compensatory adjustments being made in the reactor power level, the reactor may not be self-regulating since an increase in pressure tends to inhibit formation of moderator vapor bubbles, permitting the power level to increase. Therefore, it is preferable that the reactor internal pressure be maintained substantially constant and that reactivity be controlled by other means. The basic reactor control system consists of the control rods containing neutron absorbing materials which decrease reactivity when inserted. However, the change in the reactor power level and steam output resulting from a change in control rod position is a relatively long-term change generally taking place over a 20–30 second period. Such a delay in the change in steam output is generally undesirably slow in practice where considerably faster responses are desired.

BWR's have an additional control mechanism available which is not available to other types of reactors. They have a moderator-coolant recirculation flow that is pumped from the reactor from a point above the reactor core, and pumped back into the reactor below the core. By varying this moderator-coolant recirculation flow, the quantity of liquid coolant per unit time passing through the core may be varied. Thus, if an increase in power level is desired, recirculation flow can be increased thereby sweeping vapor bubbles out of the core at a more rapid rate. Since the proportion of the core containing liquid rather than vaporized coolant increases, the moderation effect increases and thus reactivity increases. Where it is desired to decrease the power level of the reactor, recirculation flow may be decreased, thereby sweeping the vapor bubbles out of the core at a lower rate. Since the core will then contain a higher proportion of vapor bubbles and a lower proportion of moderating liquid coolant, reactivity will decrease. Therefore, after the basic reactor operating level desired is set by adjusting the control rods the reactor power level can be varied over a substantial range by varying the coolant recirculation flow rate to follow the load steam requirements.

While the reactor will respond to a change in steam demand from the load more rapidly by adjusting the recirculation flow rate than by simply adjusting the control rod positions, there is still a delay of about 5 to 15 seconds before the new power level is reached. Thus, there is a continuing need for an improved BWR control system which would respond more rapidly to changing demands.

This delay in response has heretofore been considered inherent to the BWR because of the low heat storage, or heat capacitance of the BWR and the aforementioned problem of maintaining a relatively constant reactor pressure. Pressurized moderator-coolant type nuclear reactors, such as pressurized water reactors, hereinafter referred to as PWR's, and dual-cycle BWR's do not have this problem because of the high heat storage capacity of these types of reactors. These types of reactors have a large heat storage capacity in a steam generator in the secondary cycle of the reactor which transforms heat from a primary flow of moderator-coolant water into steam for driving a turbine. The secondary cycle of these types of reactors also serves to isolate the reactor from pressure fluctuations related to power demands. Thus, PWR's and dual-cycle BWR's are capable of responding to daily load following and frequency regulation changes in demand on direct turbine governor control whereas BWR's generally have a turbine governor slaved to a slower responding reactor. Of course this restriction on responding to load following or frequency regulation changes in demand is particularly onerous to the operator of a nuclear power plant that must meet widely varying demands.

The prior art reveals solutions to this heat capacitance problem that are satisfactory for small PWR's small dual-cycle BWR's and fossil fuel plants having one-pass boilers with a low heat capacitance. For example, in U.S. Pat. No. 3,457,725 to A. Schwarzenbach an apparatus is revealed which throttles or closes a secondary steam flow from the steam supply system to increase steam flow through the turbine and thereby meet peak demands or rapidly changing demands. The secondary steam flow from the steam supply system is used to heat plant auxiliary equipment such as reheaters and feedwater heaters. In this way Schwarzenbach employs the heat capacitance of this auxiliary equipment to cover a peak demand or a rapidly changing demand. However, the apparatus revealed by Schwarzenback is particularly unsuitable for use with a BWR because secondary steam flow is throttled to increase steam flow through the turbine without regard to the effect on the pressure of the steam in the steam supply system. Such an uncontrolled throttling of a secondary supply of steam can cause pressure fluctuations in the steam supply system. This would be unsuitable in a BWR since if the pressure of the nuclear steam supply system of a BWR is not maintained constant the reactor may not be self-regulating as previously discussed. Sudden increases in pressure inhibit the formation of moderator vapor bubbles causing a flux excursion or reactor power increase. Sudden decreases in pressure cause an increase in the formation of moderator vapor bubbles resulting in a sharp reduction in reactor power level.

Others have suggested the throttling of different sources of secondary steam in the power plant. For example, in U.S. Pat. No. 3,411,299 to F. Nettle it is suggested that extraction steam from the turbine may be throttled to improve peak load operation in a steam power plant. However, the arrangement revealed by Nettle suffers from the same disadvantages pointed out above with respect to the Schwarzenbach apparatus since Nettle throttles extraction flow to increase the output of the turbine without regard to the effect on the pressure of the steam supply system.

Others have suggested the addition of a steam accumulator or a fossil fuel source of heat to the steam supply system to provide the necessary heat storage to allow the turbine generator to respond to daily load following or frequency regulation changes in demand. However, this approach is prohibitively complex and expensive.

Others have suggested that a turbine by-pass may be employed to by-pass unwanted steam to the condenser. For example, see U.S. Pat. No. 3,128,233 to R. E. Kuerzel. However, the prior art has not considered the combination of this feature with the ability to throttle secondary flows of steam in a load following system that solves the particular problems associated with achieving rapid load following with a BWR.

Since a large number of BWR's are already in commercial use and a large percentage of the grid capacity of some electrical utilities is comprised of BWR's, there is also a need for an improved BWR load following system which may be retrofitted to existing plants.

It is therefore an object of the invention to provide a load following system for a BWR having fast initial response to rapidly changing demands.

It is another object of the invention to provide a load following system for a BWR that allows direct governor control of the turbine.

It is another object of the invention to provide a load following system for a BWR that will allow a BWR to respond to rapidly changing demands as fast or faster than a PWR.

It is another object of the invention to provide a load following system for a BWR that allows fast initial response to rapidly changing demands without a change in reactor pressure.

It is another object of the invention to provide a load following system for a BWR that is capable of fast initial response to rapidly changing demands without causing a change in reactivity or a reactor power fluctuation.

It is another object of the invention to provide a load following system for a BWR that is simple, inexpensive and that may be retrofitted to existing BWR's.

SUMMARY OF THE INVENTION

These and other objects of the invention are carried out by providing a method and apparatus for load following with a BWR system that diverts steam from the normal steam utilizing auxiliary plant equipment to control reactor pressure during a rapid change in demand. The invention allows a BWR to respond to daily load following or frequency regulation changes in demand with the turbine generator on direct governor control.

According to the method of the invention, in a BWR having a secondary flow of steam used to heat auxiliary plant equipment, a primary flow of steam from the reactor to the turbine is adjusted to compensate for rapidly changing demands in power. The moderator-coolant recirculation flow of the reactor is then adjusted to compensate for the change in demand. The pressure of the primary flow of steam and thus the pressure of the reactor is monitored during the reactor load change. In the case of a rapid increase in demand that causes a decrease in the pressure of the primary flow of steam the secondary flow of steam is reduced. This maintains the pressure of the primary flow of steam and prevents a decrease in reactor power utilizing the heat capacitance of the auxiliary equipment. After adjustment of the moderator-coolant recirculation flow has increased reactor power and increased the pressure of the primary flow of steam the secondary flow of steam is restored. The secondary flow of steam reduced to compensate for a decrease in the pressure of the primary flow of steam is preferably a portion of the primary flow of steam branched directly from the reactor. In other embodiments of the invention the secondary flow of steam is extraction steam from the turbine, or a combination of extraction steam and a portion of the primary flow of steam. Secondary flow of steam to reheaters and/or feedwater heaters may be reduced with the method thereby employing the heat capacitance of the reheaters and/or feedwater heaters to maintain the pressure of the primary flow of steam during a rapid increase in demand. In response to a rapid decrease in demand that causes an increase in the pressure of the primary flow of steam a portion of the primary flow of steam is by-passed to a condenser. This maintains the pressure of the primary flow of steam and prevents a reactor power increase by utilizing the heat capacitance of the condenser. After adjustment of the moderator-coolant recirculation flow has decreased reactor power and decreased the pressure of the primary flow of steam, the by-pass is closed.

Apparatus for implementing the method includes a turbine governor responsive to rapidly changing demands in power, a primary steam control valve and recirculation flow controller both responsive to the turbine governor, a pressure regulator for monitoring the pressure of the primary flow of steam at a point upstream of the primary steam control valve, and secondary flow control valves and a by-pass control valve, both types of valves responsive to the pressure regulator. In the operation of the apparatus, the turbine governor responds directly to rapidly changing demands for power. The primary steam control valve is responsive to the governor for adjusting the primary flow of steam to compensate for changes in the demand for power. The recirculation flow controller responds to the governor for increasing or decreasing the recirculation flow in response to an increase or decrease, respectively, in the demand for power. Because the heat storage capacity of a BWR is limited the effect of adjusting the recirculation flow of the reactor is insufficient to maintain the pressure of the primary steam flow during a rapid increase or decrease in demand. In the case of a rapid increase in demand the pressure regulator reduces the secondary flow of steam. In the case of a rapid decrease in demand the pressure regulator by-passes a portion of the primary flow of steam to the condenser. The secondary flow of steam is reduced, or a portion of the primary flow of steam is by-passed until adjustment of the recirculation flow has had time to increase or decrease reactor power.

DESCRIPTION OF THE DRAWINGS

FIG. 2 is a plot of turbine steam flow in percent versus time in seconds that illustrates the response of a PWR, a prior art BWR and a BWR with the load following system of the present invention to positive demand steps.

FIG. 3 is a plot of turbine steam flow in percent versus time in seconds illustrating the response of a PWR, a prior art BWR and a BWR including the load following system of the present invention to negative demand steps.

DESCRIPTION OF THE PREFERRED EMBODIMENTS

Figure 1:
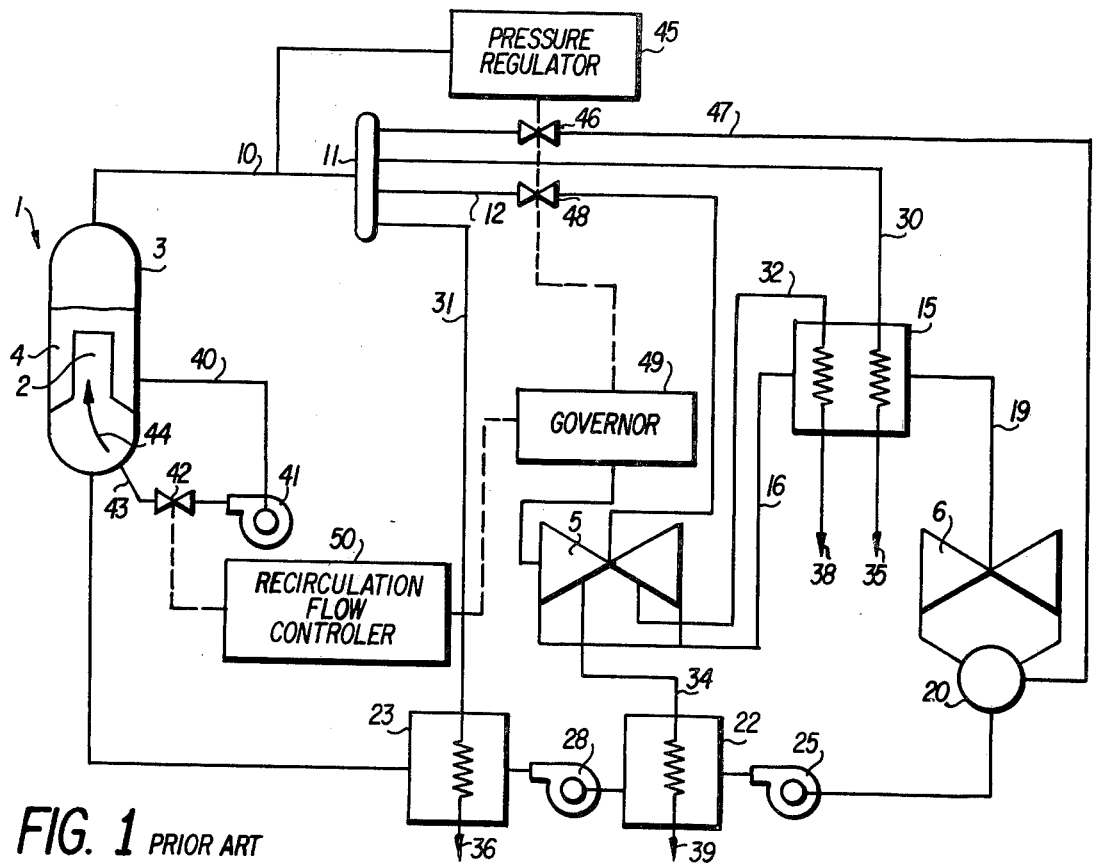
FIG. 1 is a schematic representation of the structural components of a prior art BWR.

Referring to FIG. 1, the essential structural components of the primary cycle of a prior art BWR are schematically illustrated. The reactor generally indicated at 1 includes a nuclear reactor core 2 made up of an assembly of fissionable nuclear fuel elements. The core 2 is housed in a reactor pressure vessel 3 and is immersed in a liquid moderator-coolant 4. In a BWR the liquid moderator-coolant is water. Heat generated by nuclear fission in the core 2 boils the water 4 to generate a flow of steam that drives a high pressure turbine at 5 and a lower pressure turbine at 6. A primary flow of steam from the reactor 1 flows through line 10 to a branch point or distribution header 11, where a secondary flow of steam is branched therefrom. Most of the primary flow of steam then passes through line 12 to high pressure turbine 5. Extraction steam from the turbine 5 forms a second secondary flow of steam. Most of the primary flow of steam exits the high pressure turbine 5 and enters a reheater 15 through line 16. The primary flow of steam from reheater 15 enters low pressure turbine 6 through line 19. After final expansion in low pressure turbine 6, the primary flow of steam exits the low pressure turbine and enters the condenser 20. Condensate from the condenser 20 is delivered to feedwater heaters 22 and 23 by condensate pump 25. Feedwater is pumped through the last feedwater heater 23 and back to the reactor 1 by a feedwater pump 28. In this manner, the primary flow of steam from the reactor 1 is expanded in a turbine to generate electrical power, condensed and then returned to the reactor in liquid form.

The power plant includes secondary flows of steam which are used to supply heat to auxiliary plant equipment. As used herein, the term "auxiliary plant equipment" means the normal steam utilizing apparatus of the plant system, other than the turbine, such as reheater 15 and feedwater heaters 22 and 23. This term does not include the steam condenser, or means for directing bypass steam thereto, since the condenser is not considered to be a utilizing device. In this case the secondary flows of steam are defined as a portion of the primary flow of steam branched from the primary flow of steam at distribution header 11 and extraction steam from the high pressure turbine 5. In the power plant of the present example a portion of the primary flow of steam is delivered to reheater 15 through line 30 and to feedwater heater 23 through line 31. Extraction steam from the high pressure turbine 5 is supplied to reheater 15 through line 32. Feedwater heater 22 is also heated by extraction steam from high pressure turbine 5 delivered through line 34. The portion of the primary flow of steam exiting reheater 15 at 35 may be supplied to other reheaters or to other feedwater heaters. Eventually, this portion of the primary flow of steam is discharged to the condenser 20. The portion of the primary flow of steam exiting the feedwater heater 23 at 36 may also be supplied to other feedwater heaters or reheaters. Eventually, this steam is also directed to the condenser 20. The flow of extraction steam from the reheater 15 at 38 is normally directed to other feedwater heaters and then to the condenser 20. The flow of extraction steam leaving feedwater heater 22 at 39 is normally directed to other feedwater heaters and then to the condenser 20. Thus, secondary flows of steam eventually are condensed in the condenser 20 and then returned to the reactor 1 via the feedwater heating system.

As previously discussed, in a conventional BWR, reactor power changes are accomplished by varying the recirculation flow of a moderator-coolant recirculation system. The moderator-coolant recirculation system is comprised of a line 40 which delivers moderator-coolant, in this case water, to a recirculation pump 41, a recirculation flow control valve 42 and a line 43 which returns the recirculation water to the reactor 1. In this case the pump 41 is a fixed speed pump. In some power plants a variable speed pump is provided at 41 and the valve 42 is deleted. The recirculation flow path is completed by the flow of recirculation water through the core of the reactor 1 indicated by the arrow 44. In an increase in the power level of the reactor is required recirculation flow is increased thereby sweeping vapor bubbles out of the core at a more rapid rate. Since the portion of the core containing liquid rather than vaporized coolant increases, the moderation effect increases and thus reactivity and reactor power increases. When it is desirable to effect a decrease in the power level of the reactor recirculation flow is decreased thereby sweeping fewer vapor bubbles out of the core, increasing the amount of vaporized coolant, and thus decreasing reactivity and reactor power.

Since the pressure in the reactor has an influence on boiling and the reactivity of the reactor, it is necessary to maintain the pressure of the reactor relatively constant. In the prior art this is accomplished with a pressure regulator 45, a by-pass flow control valve 46 disposed in line 47 and a primary steam flow control valve 48 disposed in line 12 between header 11 and the turbine 5. Both control valves 46 and 48 are responsive to the pressure regulator 45. The pressure regulator 45 senses the pressure of the primary flow of steam at a point upstream of the primary steam flow control valve 48. This pressure is representative of the pressure in the reactor. If the pressure of the primary flow of steam increases, the pressure regulator opens the by-pass flow control valve 46 to allow a portion of the primary flow of steam to be by-passed to the condenser 20 through line 47 until adjustment of the recirculation flow has had time to reduce reactor power. If the pressure of the primary flow of steam decreases, the pressure regulator throttles the primary steam control valve 48 reducing the steam flow to the turbine.

The prior art BWR also includes a governor 49 that is slaved to a recirculation flow controller 50. The governor 49 senses changes in speed of the turbine that are representative of changes in demand for power. In a conventional PWR or a dual-cycle BWR the primary steam flow control valve 48 is on direct governor control so that rapid changes in demand may be accommodated. However, in a prior art BWR such a load following arrangement would cause a decrease in the pressure of the reactor in the case of a rapid increase in demand and an increase in pressure during a rapid decrease in demand. This increase or decrease in pressure results from the low heat capacitance of the BWR and the inability of the recirculation flow control system to provide a rapid increase or decrease in reactor power. Thus, in a prior art BWR a load change signal from the governor 49 is sent to the recirculation flow controller 50 and after adjustment of the recirculation flow has increased or decreased reactor power, the pressure regulator 45 opens or throttles the primary steam flow control valve 48 increasing or decreasing the flow of steam to the turbine. The response of the turbine to changes in demand is thereby limited by the response of the moderator-coolant recirculation system.

Although the prior art BWR includes a turbine by-pass the foregoing problem is not completely alleviated even in the case of a rapid decrease in demand. This is because a speed bias is imposed on the governor 49. The speed bias prevents the governor from over-riding the pressure regulator 45 and opening by-pass flow control valve 46 until a significant increase in turbine speed (or decrease in demand) has occurred. This speed bias is necessary in the prior art BWR to assure that a sudden decrease in pressure and a fluctuation in reactor power does not occur when the by-pass flow control valve is opened. This speed bias is normally 10% of the speed regulation band or approximately 5% of the total speed of the turbine.

Because of the foregoing limitations the prior art load following arrangement for BWR's is generally incapable of accommodating what are normally referred to as daily load following and frequency regulation changes in demand. Daily load following refers to changes in demand of approximately 5% of the rated turbine steam flow per minute. Frequency regulation refers to a 10% step change in demand which occurs in approximately 1 second, having a 5% per minute change in demand thereafter.

Referring now to FIG. 2, the responses of a conventional PWR and BWR to positive demand steps of 10%, 20% and 35% of turbine steam flow are illustrated. The response of the PWR is illustrated by the broken curves. The response of the BWR is illustrated by the solid curves. FIG. 2 illustrates that for step changes in demand of approximately 10% of turbine steam flow the PWR is at a distinct advantage. This is due to the heat storage capacity of the steam generator in the conventional PWR and the fact that the response of the BWR is limited by the ability of the recirculation system to effect an increase in power.

Referring to FIG. 3 which is a plot of turbine steam flow in percent versus time in seconds, the responses of a conventional PWR and BWR to negative demand steps of 10%, 20% and 35% are illustrated. The response of the PWR is illustrated by the broken curves and the response of the BWR is illustrated by the solid curves. FIG. 3 illustrates that for a step decrease in demand of approximately 10% of turbine steam flow the PWR is again at a distinct advantage. This is due to the fact that in a PWR steam in the secondary cycle may be throttled without regard to reactor pressure and in a prior art BWR the response of the steam by-pass is limited by a speed bias.

According to the present invention, a method and apparatus for load following with a BWR is provided that provides load following response equal or superior to that possible with a PWR. This is accomplished by providing a method and apparatus that positively controls reactor pressure during a change in demand so that the turbine can accept changes in demand on direct governor control. The load following method comprises the following steps. The primary flow of steam from the reactor to the turbine is adjusted by direct governor control to compensate for rapidly changing demands for power. The moderator-coolant recirculation flow is simultaneously adjusted to increase or decrease reactor power according to these changes in demand. During these changes in demand the pressure of the primary flow of steam or the pressure of the reactor is monitored. In the case of a rapid increase in demand that causes a decrease in the pressure of the primary flow of steam the flow of secondary steam is reduced. This maintains the pressure of the primary flow of steam and prevents a decrease in turbine power by diverting steam to the turbine from the auxiliary plant equipment. After adjustment of the moderator-coolant recirculation flow has had time to increase reactor power and increase the pressure of the primary flow of steam the secondary flow of steam is restored.

The secondary flow of steam may be one or more portions of the primary flow of steam branched therefrom and/or one or more flows of extraction steam from the turbine. Where both a portion of the primary flow of steam and a flow of extraction steam are used these flows of steam are sequentially reduced and restored, the portion of the primary flow of steam being first to be reduced and last to be restored. Secondary steam flow to the reheaters and/or feedwater heaters may be reduced, thereby employing the heat capacitance of the reheaters and/or feedwater heaters to maintain the pressure of the reactor during a rapid power increase.

In the case of a decrease in demand that causes an increase in the pressure of the primary flow of steam the method further includes the step of by-passing a portion of the primary flow of steam to the condenser. This maintains the pressure of the primary flow of steam and prevents a reactor power increase by utilizing the heat capacitance of the condenser. The flow of primary steam to the condenser is continued until adjustment of the moderator-coolant recirculation flow has had time to decrease reactor power and decrease the pressure of the primary flow of steam.

Returning now to FIGS. 2 and 3, the effect of employing the heat capacitance of the feedwater heaters, reheaters and condenser in the foregoing manner is illustrated. Because pressure regulation of the reactor is positively effected with the heat capacitance of this auxiliary equipment, the turbine is is now placed on direct governor control. Limitations on responding to increases in demand stemming from the limited response of the recirculation system are eliminated. In the case of a rapid power decrease the speed bias is eliminated. Thus, a BWR so modified responds to each positive and negative demand case illustrated along the broken PWR response curves until the intersections 50 between the broken PWR response curves and the solid BWR response curves is reached. Thereafter, a BWR equipped with load following system of the invention will react as a conventional BWR. Taking positive and negative 10% demand steps as examples the shaded area between the broken and solid curves emphasizes the improved performance of the modified BWR. In the case of a positive demand step the shaded area represents energy borrowed from the heat storage capacity or heat capacitance of the feedwater heaters and/or reheaters. In the case of a negative demand step the shaded area represents energy directed to the condenser. In some cases, such as a 35% positive demand step the response of the modified BWR is now superior to that of the PWR because of the modified BWR combines the initially quicker response of the PWR with the more rapid overall response of the prior art BWR.

Figure 4:
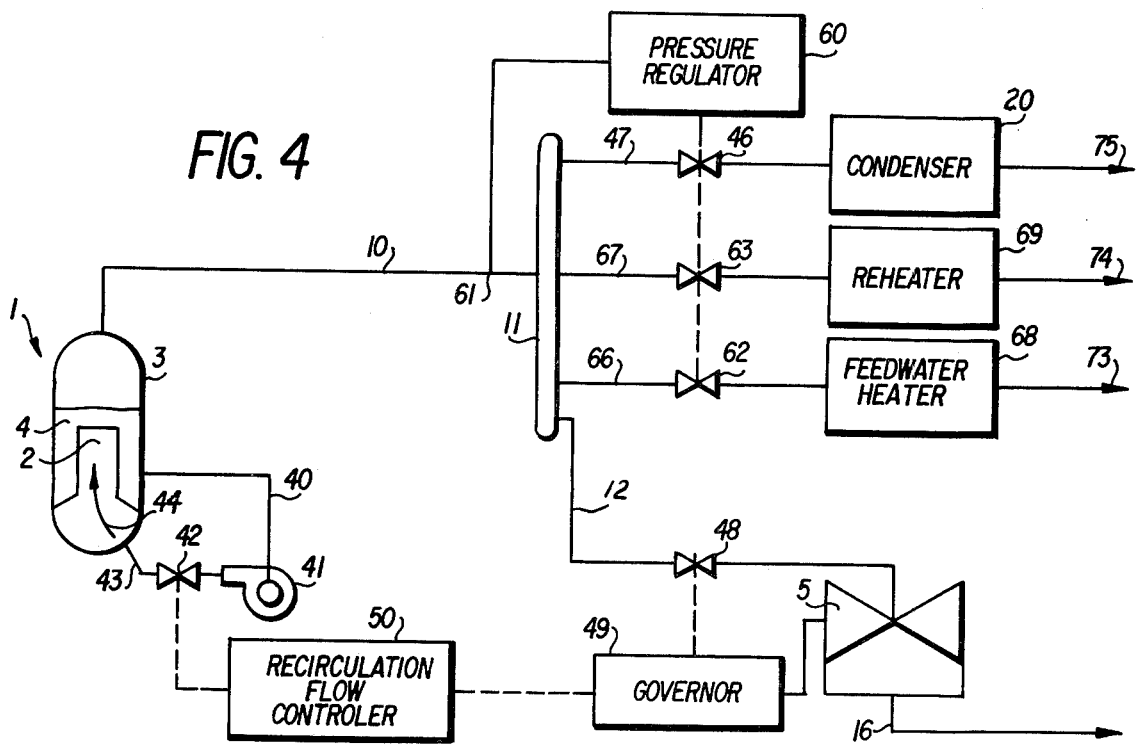
FIG. 4 is a schematic representation of one embodiment of the invention.

Referring now to FIG. 4, one specific apparatus for implementing the method is illustrated. Components in FIG. 4 corresponding to those of FIGS. 1 are given the same numeral designation. FIG. 4 illustrates an embodiment of the invention wherein a portion of the primary flow of steam branched therefrom is throttled and a by-pass flow is provided for controlling reactor pressure. With the heat capacitance of the BWR thereby increased, the turbine is now put on direct governor control. The governor 49 now directly adjusts the primary steam control valve 48 to compensate for changes in demand. A load change signal is simultaneously transmitted to the recirculation flow controller 50 which adjusts reactor power by increasing or decreasing recirculation flow. A pressure regulator 60 is provided for sensing the pressure of the primary flow of steam at a point 61 upstream of the primary steam control valve 48. This pressure is representative of reactor pressure. Alternately, the pressure of the reactor may be monitored directly. In this case the main steam line for delivering the primary flow of steam from the reactor 1 to the turbine 5 is comprised of line 10, distribution header 11 and line 12. Distribution header 11 is disposed in the main steam line at point upstream of the primary steam control valve 48. The pressure regulator 60 also controls the operation of secondary flow control valves 62 and 63 and by-pass control valve 46. In this case, the secondary flow controlled by the pressure regulator 60 is a portion of the primary flow of steam branched from the main steam line 10 by secondary steam lines 66 and 67. Secondary steam lines 66 and 67 have secondary flow control valves 62 and 63, respectively, disposed therein. The secondary steam lines 66 and 67 connect the distribution header 11 to feedwater heater 68 and reheater 69, respectively. The by-pass flow control valve 46 is disposed in a by-pass line 47 connecting the distribution header 11 to the condenser 20. The secondary flows of steam exiting feedwater heater 68 and reheater 69 at 73 and 74, respectively, are directed to other reheaters or feedwater heaters and then eventually to the condenser. The flow of primary steam by-passed to the condenser 20 through line 47 is condensed therein and a flow of condensate schematically represented by the arrow at 75 is pumped through the feedwater heating system and eventually back to the reactor 1.

In the case of a rapid increase in demand for power, the governor 49 adjusts the primary steam control valve 48 to compensate for the increase in demand. The governor 49 simultaneously sends a load change signal to the recirculation flow controller 50. The recirculation flow controller 50 adjusts recirculation flow accordingly thereby adjusting reactor power to the change in demand. When a daily load following or a frequency regulation increase in demand is required, the reactor pressure decreases due to the sluggish response of the recirculation system. The pressure regulator 60 monitoring the pressure of the primary flow of steam at 61 senses the decrease in pressure and compensates therefor by throttling secondary flow control valves 62 and 63 to reduce the secondary flow of steam in lines 66 and 67. This maintains the pressure of the primary flow of steam, and thus the reactor pressure, and prevents a decrease in reactor power by utilizing the heat capacitance of the feedwater heater 68 and reheater 69. After the increase in recirculation flow has had time to effect an increase in reactor power, the pressure regulator 60 senses an increase in the pressure of the primary flow of steam at 61 and restores the secondary flow of steam by opening secondary flow control valves 62 and 63.

In the case of a rapid decrease in demand, the governor 49 throttles the steam control valve 48 and simultaneously transmits a load change signal to recirculation flow controller 50. The recirculation flow controller 50 reduces recirculation flow. This decreases reactor power in response to the decrease in demand. When daily load following or frequency regulation decreases in demands are made, rapid throttling of the primary steam control valve 48 causes an increase in reactor pressure. The pressure regulator 60 senses the increase in the pressure of the primary flow of steam at 61 and opens by-pass control valve 46. This by-passes a portion of the primary flow of steam to the condenser 20 to maintain a relatively constant reactor pressure and prevent an increase in reactor power by utilizing the heat capacitance of the condenser. After the decrease in recirculation flow has had time to decrease reactor power, the pressure regulator 60 senses a decrease in the pressure of the primary flow of steam at 61 and closes the by-pass control valve 46.

In the embodiment of the invention illustrated in FIG. 4, a portion of the primary flow of steam that is used to heat a feedwater heater 68 and a reheater 69 is throttled. It should be understood that in other embodiments of the invention where the increase is in demand is not expected to be as great, or where existing plant layout includes only a feedwater heater or a reheater capable of being throttled, only this one auxiliary element may be throttled.

Figure 5:
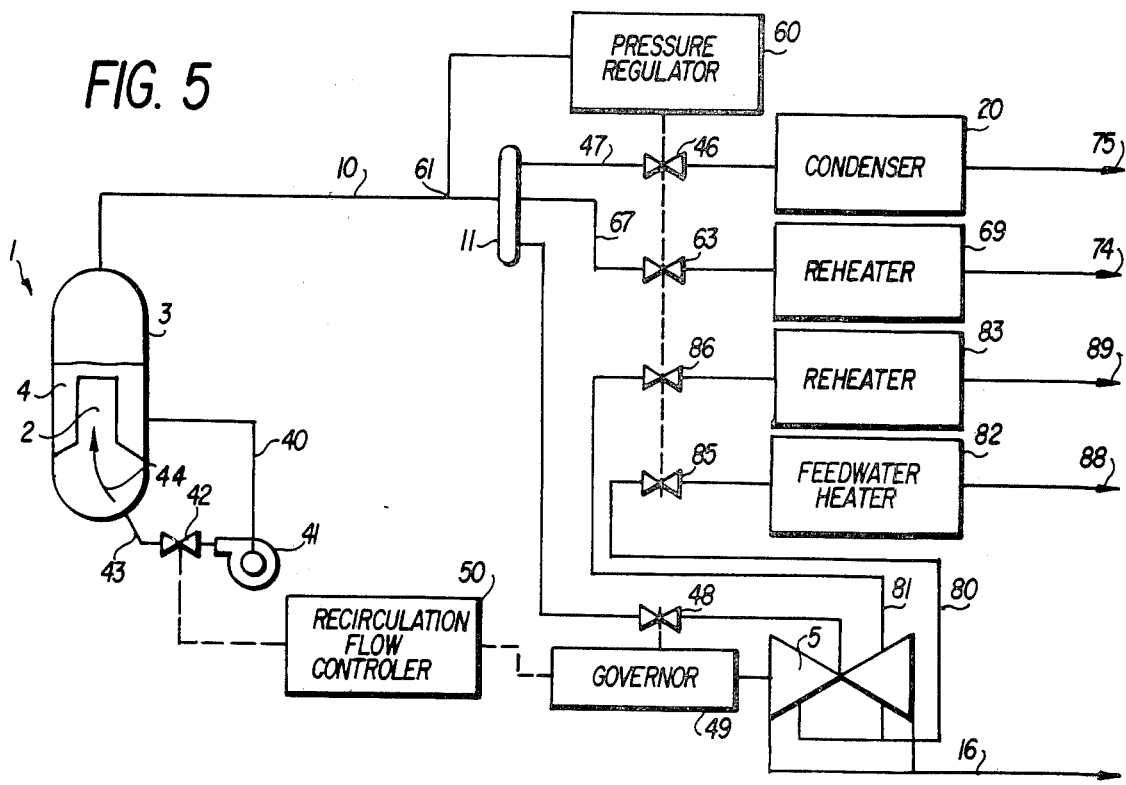
FIG. 5 is a schematic representation of another embodiment of the invention.

Referring now to FIG. 5, a second embodiment of the invention is illustrated. Components in FIG. 5 corresponding to those of FIG. 1 and FIG. 4 are given the same numeral designation. FIG. 5 illustrates an embodiment of the invention wherein the secondary flow of steam that is throttled includes a portion of the primary flow of steam branched therefrom and a flow of extraction steam from the high pressure turbine 5. In some embodiments of the invention, extraction steam alone may be throttled to maintain the pressure of the primary flow of steam during a rapid increase in demand. However, the effect of throttling extraction steam alone is often insufficient to provide the desired load following response and in preferred embodiments at least one secondary flow of primary steam is throttled in addition to the flow of extraction steam. In this case a portion of the primary flow of steam branched from distribution header 11 through line 67 to reheater 69 is also throttled. The flow of extraction steam throttled is normally delivered from the high pressure turbine 5 through lines 80 and 81 to a feedwater heater 82 and a reheater 83, respectively. Extraction steam control valves 85 and 86, responsive to the pressure regulator 60, are disposed in lines 80 and 81, respectively. A by-pass line 47 having a by-pass control valve 46 disposed therein is also provided for by-passing a portion of the primary flow of steam through the condenser 20 as described in the embodiment of FIG. 4. The portion of the primary flow of steam by-passed to the condenser 20 is eventually condensed therein and leaves the condenser 20 as condensate at 75. The portion of the primary flow of steam leaving reheater 69 at 74 may be directed to other reheaters or feedwater heaters and then eventually to the condenser 20. Extraction steam leaving the feedwater heater 82 and the reheater 83 at 88 and 89, respectively, may be directed to other reheaters or feedwater heaters and then eventually to the condenser 20. With the capability of throttling the portion of the primary flow of steam directed to reheater 69 and flows of extraction steam directed to feedwater heater 82 and the reheater 83, and the ability to by-pass a portion of the primary flow of steam to the condenser, the heat capacitance of the reactor is increased to the extent that the turbine is put on direct governor control. The governor 49 now accepts load demands directly and adjusts the primary steam control valve 48 and the recirculation flow controller 50 accordingly.

In the case of a rapid increase in demand, such as a daily load following or frequency regulation increase in demand, the response of the recirculation system is insufficient to prevent a decrease in reactor pressure. The pressure regulator 60 monitoring the pressure of the primary flow of steam at 61 senses the decrease in pressure and compensates therefor by sequentially throttling flow control valve 63 and flow control valves 85 and 86. First, the portion of the primary flow of steam to reheater 69 is throttled. If that is insufficient to maintain the pressure of the primary flow of steam, the flow of extraction steam to heaters 82 and 83 is simultaneously throttled. This serves to maintain the pressure of the primary flow of steam, preventing a reactor power decrease by utilizing the heat capacitance of the reheater 69, the feedwater heater 82 and the reheater 83. After adjustment of the recirculation flow had had time to increase reactor power, the pressure regulator 60 senses an increase in the pressure of the primary flow of steam at 61 and sequentially restores the secondary flows of steam. First, flow control valves 85 and 86 are opened restoring the flow of extraction steam. Then, flow control valve 63 is opened restoring the portion of the flow of primary steam normally directed to the reheater 69.

In the case of a rapid decrease in demand, such as a daily load following or a frequency regulation decrease in demand, rapid throttling of the primary steam control valve 48 causes an increase in reactor pressure. The pressure regulator 60 senses the increase in reactor pressure and opens by-pass control valve 46. This by-passes a portion of the primary flow of steam to the condenser 20. This maintains the pressure of the primary flow of steam and thus prevents a reactor power increase by utilizing the heat capacitance of the condenser. After adjustment of the recirculation flow has had time to effect a reactor power decrease the pressure regulator 60 senses a decrease in the pressure of the primary flow of steam at 61 and closes by-pass flow control valve 46.

In the embodiment of the invention illustrated in FIG. 5, the secondary flows of steam throttled are a portion of the primary flow of steam used to heat a reheater and flows extraction steam that are used to heat a feedwater heater and a reheater. In other embodiments of the invention a feedwater heater instead of a reheater fed by a portion of the primary flow of steam may be throttled. It should be understood that in other embodiments of the invention where the increase in demand is not as great or where the existing plant layout includes only a feedwater heater or a reheater fed by extraction steam suitable for throttling, any one of these auxiliary elements may be throttled.

Figure 6:
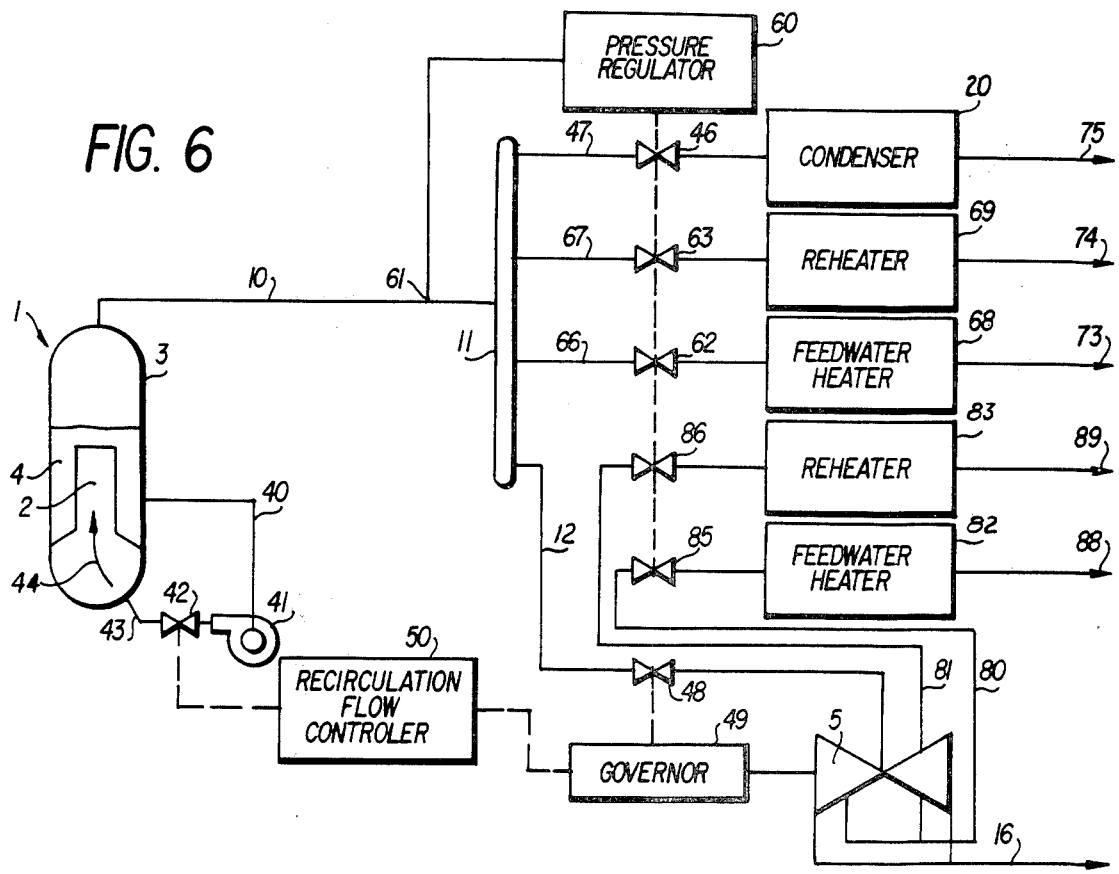
FIG. 6 is a schematic representation of another embodiment of the invention.

It should also be understood that a combination of secondary flows of primary steam and flows of extraction steam may be throttled in effect combining the embodiments of FIG. 4 and FIG. 5, to create a load following system with the capacity of responding to very large changes in demand. The embodiment illustrated in FIG. 6 illustrates such a load following system. Portions of the primary flow of steam flowing through lines 66 and 67 and flows of extraction steam flowing through lines 80 and 81 are simultaneously or sequentially throttled in response to rapid increases in demand by the pressure regulator 60. Normally, these secondary flows are sequentially throttled, the portion of the primary flow of steam being first to be reduced and last to be restored. A portion of the primary flow of steam is by-passed to condenser 20 through the line 47 in response to rapid decreases in demand. Components in FIG. 6 corresponding to those illustrated in FIGS. 1, 4 and 5 are given the same numeral designation and the operation of the load following system in FIG. 6 is in all respects the same as that of FIGS. 4 and 5 except that four flows of secondary steam used to heat auxiliary plant equipment are throttled. It should be understood that the embodiment of FIG. 6 is provided only as an example of a load following system combining the throttling of a portion of the primary flow of steam and the throttling of extraction steam. Any one or a number of feedwater heaters and reheaters fed by either a portion of the primary flow of steam or a flow of extraction steam, depending on the increase in demand expected or the existing plant layout, may be employed according to the invention.

It is therefore to be understood that the embodiments of the invention herein illustrated are exemplary and not restrictive of the invention, the scope of which is defined in the appended claims. All modifications that come within the meaning and range of equivalency of the claims are intended to be included therein.

What is claimed as new and desired to be secured by Letters Patent of the United States is:

1. In a power plant of the type wherein a turbine is driven by a primary flow of steam at a predetermined pressure from a single-cycle boiling moderator-coolant nuclear reactor, said reactor having means to vary moderator-coolant recirculation flow, to vary reactor power and said power plant including a secondary flow of steam for heating steam utilizing auxiliary plant equipment, a method for load following comprising the steps of:

adjusting said primary flow of steam from said reactor to said turbine for changing demands for turbine power;

adjusting said moderator-coolant recirculation flow through the reactor in response to changing demands for turbine power;

monitoring the pressure of said primary flow of steam;

reducing said secondary flow of steam to said steam utilizing auxiliary plant equipment, in the case of a rapid increase in turbine demand that causes a decrease in the pressure of the primary flow of steam, thereby maintaining said pressure and preventing a decrease in turbine power; and restoring said secondary flow of steam to said auxiliary plant equipment after adjustment of said moderator-coolant recirculation flow has increased reactor power and increased the pressure of said primary flow of steam.

2. The method of claim 1, wherein said secondary flow of steam comprises a portion of said primary flow of steam branched therefrom.

3. The method of claim 1, wherein said secondary flow of steam comprises a flow of extraction steam from said turbine.

4. The method of claim 1, wherein said secondary flow of steam includes a portion of said primary flow of steam branched therefrom and a flow of extraction steam from said turbine.

5. The method of claim 4, wherein said portion of said primary flow of steam and said flow of extraction steam are sequentially reduced and sequentially restored, said portion of said primary flow of steam being first to be reduced and last to be restored.

6. The method of claim 1, wherein said auxiliary plant equipment includes a reheater, said reheater being reheated by said secondary flow of steam, thereby utilizing the heat capacitance of said reheater to maintain the pressure of said primary flow of steam during a rapid increase in demand.

7. The method of claim 1, wherein said auxiliary plant equipment includes a feedwater heater, said feedwater heater being heated by said secondary flow of steam, thereby utilizing the heat capacitance of said feedwater heater to maintain the pressure of said primary flow of steam during a rapid increase in demand.

8. The method of claim 1, wherein said power plant includes a condenser, the method further including the steps of:

by-passing a portion of said primary flow of steam to said condenser, in the case of a rapid decrease in steam demand that causes an increase in the pressure of the primary flow of steam, thereby maintaining said pressure and preventing a turbine power increase by utilizing the heat capacitance of said condenser; and continuing the by-pass of said portion of said primary flow of steam until adjustment of said moderator-coolant recirculation flow has decreased reactor power and decreased the pressure of said primary flow of steam.

9. In a power plant of the type wherein a turbine is driven by a primary flow of steam at a predetermined pressure from a single-cycle boiling moderator-coolant nuclear reactor, said reactor including means to vary moderator-coolant recirculation flow to vary reactor power, and said power plant including a secondary flow of steam for heating steam utilizing auxiliary plant equipment, a load following system comprising:

a turbine governor responsive to changing demands for turbine power;

a primary steam control valve responsive to said governor for adjusting said primary flow of steam in response to said changing demands for turbine power;

recirculation flow control means responsive to said governor for adjusting said moderator-coolant recirculation flow through said reactor in response to said changing demands for turbine power;

a pressure regulator for monitoring the pressure of said primary flow of steam at a point upstream of said primary steam control valve; and secondary flow control means responsive to said pressure regulator for
   (i) reducing said secondary flow of steam, in the case of a rapid increase in turbine demand that causes a decrease in the pressure of the primary flow of steam, thereby maintaining said pressure and preventing a decrease in turbine power, and
   (ii) restoring said secondary flow of steam after adjustment of said moderator-coolant recirculation flow has increase reactor power and increased the pressure of said primary flow of steam.

10. The power plant of claim 9, wherein said secondary flow of steam comprises a portion of said primary flow of steam branched therefrom.

11. The power plant of claim 9, wherein said secondary flow of steam comprises a flow of extraction steam from said turbine.

12. The power plant of claim 9, wherein said secondary flow of steam includes a portion of said primary flow of steam branched therefrom and a flow of extraction steam from said turbine.

13. The power plant of claim 12, wherein said portion of said primary flow of steam and said flow of extraction steam are sequentially reduced and sequentially restored, said portion of said primary flow of steam being first to be reduced and last to be restored.

14. The power plant of claim 9, wherein said auxiliary plant equipment includes a reheater, said reheater being heated by said secondary flow of steam, thereby utilizing the heat capacitance of said reheater to maintain the pressure of said primary flow of steam during a rapid increase in demand.

15. The power plant of claim 9, wherein said auxiliary plant equipment includes a feedwater heater, said feedwater heater being heated by said secondary flow of steam, thereby utilizing the heat capacitance of said feedwater heater to maintain the pressure of said primary flow of steam during a rapid increase in demand.

16. The power plant of claim 9, further including: a condenser and by-pass flow control means responsive to said pressure regulator for
   (i) by-passing a portion of said primary flow of steam to said condenser, in the case of a rapid decrease in steam demand that causes an increase in the pressure of the primary flow of steam thereby maintaining said pressure and preventing a turbine power increase by utilizing the heat capacitance of said condenser, and (ii) continuing the by-pass of a portion of said primary flow of steam until adjustment of said moderator-coolant recirculation flow has decreased reactor power and decreased the pressure of said primary flow of steam.

17. The power plant of claim 16, wherein said secondary flow of steam includes a portion of said primary flow of steam branched therefrom and a flow of extraction steam from said turbine.

18. The power plant of claim 9, further including:
a main steam line for delivering said primary flow of steam from said reactor to said turbine;
said primary steam control valve being disposed in said main steam line;
said pressure regulator sensing the pressure in said main steam line at a point upstream from said primary steam control valve; and
a header disposed in said main steam line at a point upstream of said primary steam control valve;
said secondary flow control means comprising:
(i) a secondary steam line connecting said auxiliary plant equipment to said header, and
(ii) a secondary steam control valve responsive to said pressure regulator disposed in said secondary steam line for sequentially reducing and restoring said secondary flow of steam in the case of a rapid increase in demand.

19. The power plant of claim 16, further including:
a main steam line for delivering said primary flow of steam from said reactor to said turbine;
said primary steam control valve being disposed in said main steam line;
said pressure regulator sensing the pressure in said main steam line at a point upstream from said primary steam control valve; and
a header disposed in said main steam line at a point upstream of said primary steam control valve; said secondary flow control means comprising:
(i) a secondary steam line connecting said auxiliary plant equipment to said header, and
(ii) a secondary steam control valve responsive to said pressure regulator disposed in said secondary steam line for sequentially reducing and restoring said secondary flow of steam in the case of a rapid increase in demand, and
said by-pass flow control means comprising:
(i) a primary steam by-pass line connecting said condenser to said header, and
(ii) a primary steam by-pass control valve responsive to said pressure regulator disposed in said primary steam by-pass line for sequentially opening said by-pass line and closing said by-pass line in the case of a rapid decrease in demand.

20. The power plant of claim 17, further including:
a main steam line for delivering said primary flow of steam from said reactor to said turbine;
said primary steam control valve being disposed in said main steam line;
said pressure regulator sensing the pressure in said main steam line at a point upstream from said primary steam control valve; and
a header disposed in said main steam line at a point upstream of said primary steam control valve;
said secondary flow control means comprising:
(i) a secondary steam line connecting said auxiliary plant equipment to said header,
(ii) a secondary steam control valve responsive to said pressure regulator disposed in said secondary steam line for sequentially reducing and restoring said portion of said primary flow of steam branched therefrom in the case of a rapid increase in demand,
(iii) an extraction steam line connecting said auxiliary plant equipment to said turbine, and
(iv) an extraction steam control valve responsive to said pressure regulator disposed in said extraction steam line for sequentially reducing and restoring said flow of extraction steam in the case of a rapid increase in demand; and said by-pass flow control means comprising:
(i) a primary steam by-pass line connecting said condenser to said header, and
(ii) a primary steam by-pass control valve responsive to said pressure regulator disposed in said primary steam by-pass for sequentially opening said by-pass line and closing said by-pass line in the case of a rapid decrease in demand.

21. The power plant of claim 20, wherein said auxiliary plant equipment includes a reheater, said reheater being heated by said secondary flow of steam, thereby utilizing the heat capacitance of said reheater to maintain the pressure of said primary flow of steam, to provide rapid load following and to prevent a decrease in reactor power during a rapid increase in demand.

22. The power plant of claim 20, wherein said auxiliary plant equipment includes a feedwater heater, said feedwater heater being heated by said secondary flow of steam, thereby utilizing the heat capacitance of said feedwater heater to maintain the pressure of said primary flow of steam, to provide rapid load following and to prevent a decrease in reactor power during a rapid increase in demand.

* * * * *